(12) United States Patent
Cheng et al.

(10) Patent No.: US 11,425,305 B2
(45) Date of Patent: Aug. 23, 2022

(54) CONTROL METHOD AND APPARATUS, ELECTRONIC DEVICE, AND STORAGE MEDIUM

(71) Applicant: BEIJING XIAOMI MOBILE SOFTWARE CO., LTD., Beijing (CN)

(72) Inventors: Chihyi Cheng, Beijing (CN); Kuangyen Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/241,047

(22) Filed: Apr. 26, 2021

(65) Prior Publication Data
US 2022/0038639 A1 Feb. 3, 2022

(30) Foreign Application Priority Data
Jul. 31, 2020 (CN) .......................... 202010763491.0

(51) Int. Cl.
*H04N 5/232* (2006.01)

(52) U.S. Cl.
CPC ... *H04N 5/232935* (2018.08); *H04N 5/23296* (2013.01); *H04N 5/23299* (2018.08)

(58) Field of Classification Search
CPC ......... H04N 5/232935; H04N 5/23299; H04N 5/23296; H04N 5/232933; H04N 5/23216; H04N 5/23218
USPC .................................................... 348/240.99
See application file for complete search history.

(56) References Cited

U.S. PATENT DOCUMENTS

| | | | |
|---|---|---|---|
| 9,509,901 B2 * | 11/2016 | Matsuzawa | H04N 5/23216 |
| 9,961,268 B2 * | 5/2018 | Kimura | H04N 5/232933 |
| RE46,976 E * | 7/2018 | Makii | H04N 5/2628 |
| 10,425,576 B2 * | 9/2019 | Kim | B64C 39/024 |
| 2010/0171874 A1 * | 7/2010 | Park | H04N 5/23216 348/E5.04 |
| 2010/0208107 A1 * | 8/2010 | Nonaka | H04N 5/232933 348/240.99 |
| 2016/0142639 A1 * | 5/2016 | Kimura | H04N 5/232945 348/240.3 |
| 2016/0241767 A1 * | 8/2016 | Cho | G06F 3/0346 |
| 2016/0327950 A1 * | 11/2016 | Bachrach | G06F 3/00 |
| 2017/0150031 A1 * | 5/2017 | Oshima | H04N 5/23216 |
| 2017/0155828 A1 * | 6/2017 | Irie | H04N 5/23293 |
| 2017/0180635 A1 | 6/2017 | Hayashi | |

(Continued)

FOREIGN PATENT DOCUMENTS

| | | | |
|---|---|---|---|
| CN | 104735355 A | 6/2015 | |
| CN | 107370945 A | 11/2017 | |
| CN | 110661979 A | 1/2020 | |

OTHER PUBLICATIONS

Partial Supplementary European Search Report in the European application No. 21170822.7, dated Dec. 20, 2021, (19 pages).

(Continued)

*Primary Examiner* — Pritham D Prabhakher
(74) *Attorney, Agent, or Firm* — Arch & Lake LLP (57) ABSTRACT

A control method includes: a preview image is displayed; a user input acting on the preview image is received, in which the user input includes an adjustment of a display position of a target object in the preview image from a first position to a second position; and in response to the user input, a shooting angle of the camera is adjusted according to the adjustment of the display position.

17 Claims, 9 Drawing Sheets

(56) References Cited

U.S. PATENT DOCUMENTS

| | | | | |
|---|---|---|---|---|
| 2017/0293297 | A1* | 10/2017 | Kim | B64D 47/08 |
| 2017/0339337 | A1* | 11/2017 | Kim | H04N 5/23216 |
| 2018/0103195 | A1* | 4/2018 | Kim | H04N 5/23203 |
| 2018/0188723 | A1* | 7/2018 | Lee | G05D 1/0016 |
| 2019/0098190 | A1* | 3/2019 | Hosoe | G06F 1/1632 |
| 2020/0162682 | A1* | 5/2020 | Cheng | H04N 5/23203 |
| 2020/0366775 | A1* | 11/2020 | Lee | H04N 5/2252 |
| 2021/0035332 | A1* | 2/2021 | Cho | G06F 3/011 |

OTHER PUBLICATIONS

Supplementary European Search Report in the European application No. 21170822.7, dated Mar. 11, 2022, (18 pages).

* cited by examiner

CONTROL METHOD AND APPARATUS, ELECTRONIC DEVICE, AND STORAGE MEDIUM

CROSS-REFERENCE TO RELATED APPLICATION

This application is based upon and claims priority to Chinese Patent Application No. 202010763491.0 filed on Jul. 31, 2020, the content of which is hereby incorporated by reference in its entirety for all purposes.

TECHNICAL FIELD

The present disclosure relates to the field of electronic technology, and particularly to, a control method and apparatus, an electronic device, and a storage medium.

BACKGROUND

In the related art, a camera may be mounted on an electronic device to provide a corresponding photographing function for the electronic device. However, during shooting, if a target object to be shot by the device is at a position expected by a user, the user needs to adjust the position of the target object on a picture to be shot by constantly adjusting the position of the electronic device, and the operation is cumbersome and not intuitive, which affects the experience of using the electronic device by the user.

SUMMARY

The present disclosure provides a control method, apparatus, and a non-transitory computer-readable storage medium.

According to a first aspect of the present disclosure, a control method is provided. The method may be applied by an electronic device having a camera. The method may include: displaying a preview image captured by a camera of an electronic device; receiving a user input acting on the preview image, in which the user input includes an adjustment of a display position of a target object in the preview image from a first position to a second position; and in response to the user input, adjusting a shooting angle of the camera according to the adjustment of the display position.

According to a second aspect of the present disclosure, a control apparatus is provided, the apparatus including: a display screen; a processor; and a memory for storing instructions executable by the processor, herein the display screen is configured to display a preview image captured by a camera of an electronic device; and the processor is configured to: receive a user input acting on the preview image, in which the user input includes an adjustment of a display position of a target object in the preview image from a first position to a second position; and in response to the user input, adjust a shooting angle of the camera according to the adjustment of the display position.

According to a third aspect of the present disclosure, a non-transitory computer-readable storage medium is provided having stored thereon instruction that, when executed by a processor of an electronic device, cause the electronic device to perform operations of a control methods, the method including: displaying a preview image captured by a camera of the electronic device; receiving a user input acting on the preview image, in which the user input includes an adjustment of a display position of a target object in the preview image from a first position to a second position; and in response to the user input, adjusting a shooting angle of the camera according to the adjustment of the display position.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
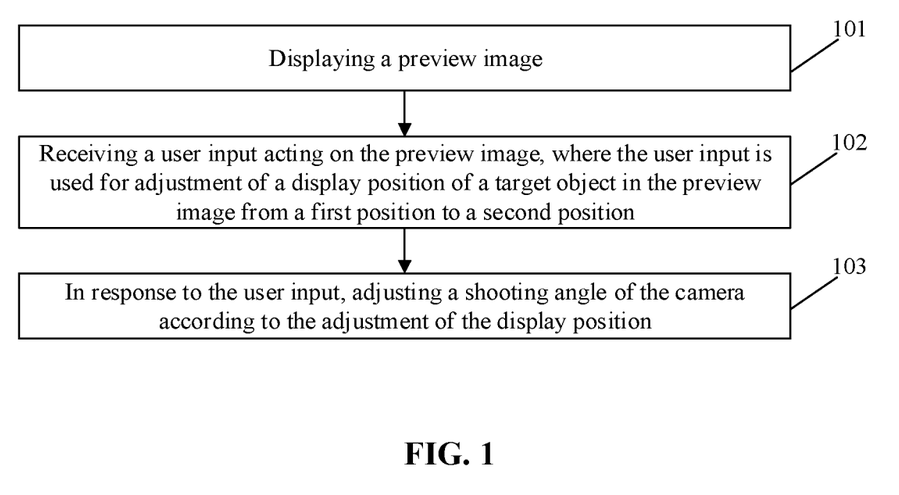
FIG. 1 is a flowchart of a control method according to an example of the present disclosure.

FIG. 1 is a flowchart of a control method according to an example of the present disclosure. As shown in FIG. 1, the method may be applied to an electronic device having a camera, and includes the following operations.

In operation 101, a preview image is displayed.

In operation 102, a user input acting on the preview image is received. The user input is used for adjustment of a display position of a target object in the preview image from a first position to a second position.

In operation 103, in response to the user input, a shooting angle of the camera is adjusted according to the adjustment of the display position.

Herein, the electronic device includes a mobile terminal and a fixed terminal. The mobile terminal includes a mobile phone, a notebook computer, a tablet computer, a wearable electronic device and the like, and the fixed terminal includes a personal computer, a television and the like. In the examples of the present disclosure, the electronic device has a camera. During the use of the electronic device, the camera may be started based on a camera application installed on the electronic device. After the camera is started successfully, the preview image may be displayed on a display screen of the electronic device.

Figure 2:
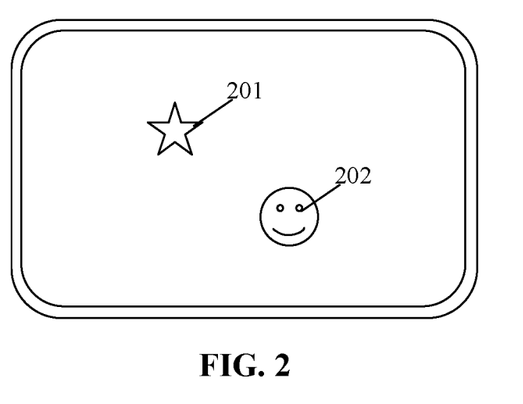
FIG. 2 is a first schematic diagram of a display interface according to an example of the present disclosure.

In some examples, the preview image may include at least one shot object, and FIG. 2 is a first schematic diagram of a display interface according to an example of the present disclosure. As shown in FIG. 2, the preview image is displayed on the display interface on the display screen of the electronic device, and the preview image includes a first shot object 201 and a second shot object 202. During the implementation of the examples, the user input may be received based on any shot object included in the preview image. For example, the user input may be received based on the first shot object or the second shot object.

Herein, the first position may be a current position of the target object in the preview image, and the second position may be a target position where the target object is to be moved.

In the implementation of the example of the present disclosure, the user may observe the position of each shot object based on the preview image displayed on the display screen of the electronic device. If the position of each shot object is not the one desired by the user, the user input may be received based on the display screen, and the shooting angle of the camera may be adjusted based on the user input to adjust the display position of each shot object. In this way, the position of each shot object in the preview image can be observed in real time during the adjustment. When the shot object is not in the desired position, the adjustment can be performed in real time. As a result, the operations are simple and intuitive, thus the user's experience of using the electronic device can be improved.

In some examples, the method may further include the following operation.

A shot object of the preview image on which a selection operation is acted is detected, and the shot object is determined as the target object.

Figure 3:
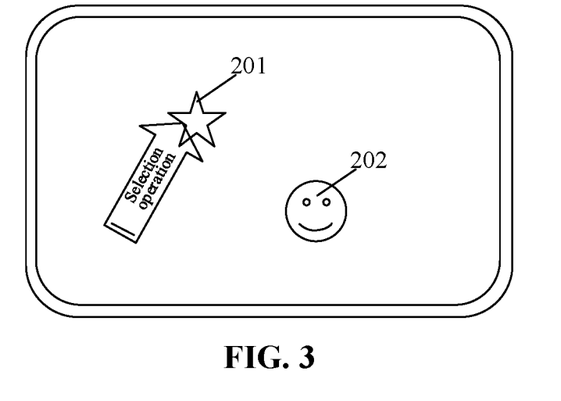
FIG. 3 is a second schematic diagram of a display interface according to an example of the present disclosure.

FIG. 3 is a second schematic diagram of a display interface according to an example of the present disclosure. As shown in FIG. 3, the preview image includes a first shot object 201 and a second shot object 201. In the implementation of the example, a selection operation for each shot object may be detected, and a shot object on which the selection operation is acted is determined as the target object. For example, if the selection operation acted on the first shot object is detected, the first shot object may be determined as the target object. Herein, the selection operation may be a click operation, a long press operation, or the like, and the click operation may be a double-click operation.

Taking the selection operation being a long press operation as an example, after the long press operation acted on the first shot object is detected, the first shot object may be determined as the target object. In the implementation of the example, the display position of the target object may be adjusted according to the user input acted on the target object, so as to adjust the shooting angle of the camera according to the adjustment of the display position. For example, if a slide operation on the target object is detected, a deflection direction and a deflection angle of the shooting angle of the camera can be determined based on a sliding direction and a sliding trajectory of the slide operation, and the shooting angle of the camera is thus adjusted based on the deflection direction and the deflection angle.

In some examples, shooting angle of the camera may be adjusted by controlling the rotation of the camera. For example, the camera may be mounted on a pan-tilt-zoom structure (which is provided on the electronic device), the rotation of the pan-tilt-zoom structure is controlled to drive the rotation of the camera. In other examples, when the camera assembly includes a light deflection component, the shooting angle of the camera may also be adjusted by controlling the rotation of the light deflection component. Herein, the light deflection component may include a prism, such as a triangular prism.

In the example of the present disclosure, adjustment of the shooting angle of the camera can be realized based on the user input received from the target object selected from the preview image, the convenience of the camera control can be improved, and the current position of each shot object can be directly observed based on the preview image, thereby being more intuitive.

In some examples, the user input may include a touch input. The operation of adjusting the shooting angle of the camera according to the adjustment of the display position in response to the user input may include: the display position of the target object is adjusted according to a touch gesture of the touch input, the deflection direction and/or the deflection angle of the shooting angle of the camera are determined according to the adjustment of the display position, and the shooting angle of the camera is adjusted according to the deflection direction and/or the deflection angle.

Herein, the user input applied to the target object may be the touch input. When the user input is the touch input, the deflection direction and/or the deflection angle of the shooting angle of the camera may be determined according to the touch gesture of the touch input, and the shooting angle of the camera may be adjusted according to the deflection direction and/or the deflection angle. For example, if the touch gesture of the touch input is a gesture for rotating the target object, the deflection direction of the shooting angle of the camera can be determined according to the rotation direction of the target object, and the shooting angle of the camera can be adjusted according to the deflection direction.

In the example of the present disclosure, the deflection direction and/or the deflection angle of the shooting angle of the camera can be determined according to the touch gesture of the touch input, so that the user can adjust the target object to the desired position and/or the desired angle according to his/her own requirements.

In some examples, the operation of receiving the user input acting on the preview image may include: a click input at the second position in the preview image is received. The operation of adjusting shooting angle of the camera according to the adjustment of the display position may include: a first deflection direction and a first deflection angle of the shooting angle of the camera are determined according to a relative position between the first position and the second position, and the shooting angle of the camera is adjusted according to the first deflection direction and the first deflection angle.

Herein, the second position is different from the first position. In the example of the disclosure, when the click input at the second position in the preview image is detected, the relative position between the first position and the second position may be determined to determine the first deflection direction and the first deflection angle of the shooting angle of the camera, and the shooting angle of the camera is adjusted according to the first deflection direction and the first deflection angle. In some examples, the relative position includes a relative distance and a relative direction. The relative distance may be a distance between the first position and the second position in the preview image, and the relative direction may be a linear direction from the first position to the second position. The click input may include a double-click input, a single-click input, or a long press input.

In the example of the present disclosure, the shooting angle of the camera can be adjusted based on the click input and the relative position between the first position and the second position, so that the convenience of adjusting the camera can be improved.

In some examples, the operation of receiving the user input acting on the preview image may include: a movement input that moves the target object from the first position to the second position is received. The operation of adjusting the shooting angle of the camera according to the adjustment of the display position may include: a second deflection direction of the shooting angle of the camera is determined according to the movement direction of the movement input, a second deflection angle of the shooting angle of the camera is determined according to a moving trajectory of the movement input, and the shooting angle of the camera is adjusted according to the second deflection direction and the second deflection angle.

Taking the user input being the movement input as an example, when the movement input is detected, it is represented that the user needs to move the position of the target object in the preview image. For example, the target object may be moved to the right side of the preview image, or the target object may be moved to the left side of the preview image, or the like.

In the example of the present disclosure, the movement input for the target object can be detected. When the movement input is detected, the second deflection direction of the shooting angle of the camera can be determined according to the movement direction of the movement input, the second deflection angle of the shooting angle of the camera can be determined according to the moving trajectory of the movement input, and the shooting angle of the camera can be adjusted according to the second deflection direction and the second deflection angle. In the example of the disclosure, the shooting angle of the camera can be adjusted based on the movement direction and the moving trajectory of the movement input, and the shooting angle of the camera can be adjusted in real time when the moving trajectory changes. Therefore, the convenience of adjusting the shooting angle of the camera is improved.

In some examples, the operation of receiving the user input acting on the preview image may include: a press input acting on the target object is received. The operation of adjusting the shooting angle of the camera according to the adjustment of the display position may include: an adjustment distance of the display position of the target object is determined based on preset correspondences between press force values and moving distances and a press force value of the press input, a third deflection angle of the shooting angle of the camera is determined according to the adjustment distance, a third deflection direction of the shooting angle of the camera is determined according to a press direction of the press input, and the shooting angle of the camera is adjusted according to the third deflection direction and the third deflection angle.

Herein, when the press input acting on the target object is detected, the press force value of the press input and the press direction of the press input can be determined. In this way, the adjustment distance of the display position of the target object can be determined based on the preset correspondences between the press force values and the moving distances and the determined press force value, the third deflection angle of the shooting angle of the camera can be determined according to the adjustment distance, the third deflection direction of the shooting angle of the camera can be determined according to the press direction of the press input, and the shooting angle of the camera can be adjusted according to the third deflection direction and the third deflection angle. In the example of the disclosure, the shooting angle of the camera can be adjusted based on the press input and the press direction and the press force value of the press input, so that the convenience of adjusting the shooting angle of the camera can be improved.

In some examples, before receiving the user input acting on the preview image, the method may further include: a movable range of the target object is displayed, herein the movable range is determined according to a deflection range of the shooting angle of the camera.

Figure 4:
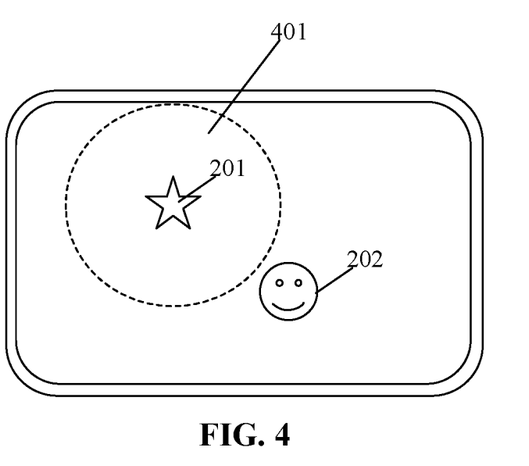
FIG. 4 is a third schematic diagram of a display interface according to an example of the present disclosure.

In some examples, the movable range of the target object may be displayed when the selection operation for the target object is detected. FIG. 4 is a third schematic diagram of a display interface according to an example of the present disclosure. As shown in FIG. 4, the preview image includes the first shot object 201 and the second shot object 202. In the implementation process, the selection operation for each shot object may be detected, and the shot object on which the selection operation is acted is determined as a target object. After the target object is determined, the movable range of the target object may be displayed on the display interface. For example, if a selection operation applied to the first shot object is detected, the first shot object may be determined as the target object.

In the example of the present disclosure, a movable range 401 of the target object may be displayed after the target object is determined. Since the movable range 401 is determined according to the deflection range of the shooting angle of the camera, the user can rationally adjust the display position of the target object according to the movable range and thus adjust the shooting angle of the camera. Therefore, it is possible to reduce the possibility of affecting the image display effect due to the limitation from the limit value of the shooting angle of the camera.

In the implementation process, the target object to be moved in the preview image may be selected based on the selection operation, and when the long press operation applied to the target object is detected, the movable range is displayed in the preview image, so that the user can directly drag the target object within the movable range and move the target object to a designated position of the preview image by adjusting the shooting angle of the camera. In other examples, after the target object is determined, the target position of the target object may also be determined based on the detected click operation, and the target object may be moved to the target position by adjustment of the shooting angle of the camera.

In some examples, the electronic device further includes a pan-tilt-zoom structure connected to the camera. The operation of adjusting the shooting angle of the camera according to the adjustment of the display position may include: the pan-tilt-zoom structure is controlled to drive the camera to rotate according to the adjustment of the display position, so as to adjust the shooting angle of the camera.

Herein, the pan-tilt-zoom structure may be provided inside the electronic device and may have one or two planes of rotation. For example, the pan-tilt-zoom structure has two planes of rotation, which may be perpendicular to each other.

The rotation angle of the pan-tilt-zoom structure in each plane of rotation may be equal to or less than 360 degrees.

In some examples, the angle of rotation of the pan-tilt-zoom structure may be set as desired. For example, the angle may be equal to 360 degrees, or 180 degrees, 90 degrees, or the like. For another example, the pan-tilt-zoom structure may be a panoramic pan-tilt-zoom. In other examples, the rotation angle of the pan-tilt-zoom structure may be less than a set angle. For example, the rotation angle of the pan-tilt-zoom structure may be less than 180 degrees. In the example of the disclosure, the rotation angle of the pan-tilt-zoom structure is set to be smaller than the set angle, so that an internal space of the electronic device can be saved compared with a case of the panoramic pan-tilt-zoom structure.

In other examples, a pan-tilt-zoom adjustment control may also be provided on the preview image. The pan-tilt-zoom adjustment control includes an icon that is displayed overlaying the preview image and is different from an object shot in the preview image.

For example, the pan-tilt-zoom adjustment control may be configured in the upper left corner of the preview image, or the pan-tilt-zoom adjustment control or the like may be configured in the upper right corner of the preview image. In other examples, multiple pan-tilt-zoom adjustment controls independent from the preview image may also be configured on the preview image, and the rotation of the pan-tilt-zoom is controlled based on the plurality of pan-tilt-zoom adjustment controls. For example, in case of multiple pan-tilt-zoom adjustment controls, the pan-tilt-zoom structure may be controlled to rotate in an XOY plane of the Cartesian coordinate based on a first pan-tilt-zoom adjustment control, the pan-tilt-zoom structure may be controlled to rotate in the YOZ plane based on a second pan-tilt-zoom adjustment control, and the pan-tilt-zoom structure may be controlled to rotate in the XOZ plane based on a third pan-tilt-zoom adjustment control.

After the pan-tilt-zoom adjustment control is configured, it may be detected whether there is an input operation acting on the pan-tilt-zoom adjustment control, and when a user input acting on the pan-tilt-zoom adjustment control is detected, the pan-tilt-zoom structure may be controlled, based on the user input, to rotate, so as to adjust the shooting angle of the camera. For example, the rotation parameter of the pan-tilt-zoom structure may be determined based on the movement parameter input by the user, and the pan-tilt-zoom structure is controlled to rotate according to the rotation parameter. The movement parameter may include direction information and displacement information input by the user, and the rotation parameter may include a rotation direction and a rotation angle of the pan-tilt-zoom structure, or the like. The user input may be a slide operation, a rotating operation, or the like.

In the example of the present disclosure, the pan-tilt-zoom structure can be rotated during the preview of the image, so that the acquisition angle of the camera is adjusted, and the preview image acquired by the camera after the acquisition angle is adjusted is displayed on the display screen of the electronic device, so that the user can determine an effect of the adjustment in time.

In the example of the present disclosure, the pan-tilt-zoom structure is provided inside the electronic device and a camera is mounted on the pan-tilt-zoom structure, then the pan-tilt-zoom adjustment control can be configured on a preview image during use of the electronic device, and rotation of the pan-tilt-zoom structure can be controlled based on a detected user input acting on the pan-tilt-zoom adjustment control. In this way, it is possible to directly control the rotation of the pan-tilt-zoom structure based on the pan-tilt-zoom adjustment control provided on the preview image, thereby adjusting the shooting angle of the camera. Since the position of each shot object in the preview image can be observed during the adjustment process, the operation is simple and intuitive, thus the user's experience of using the electronic device can be improved.

In some examples, when the user input is a movement input, it is also possible to determine the rotation direction of the pan-tilt-zoom structure according to a movement direction of the movement input, and determine the rotation angle of the pan-tilt-zoom structure according to a movement trajectory of the movement input. The operation of determining the rotation direction of the pan-tilt-zoom structure according to the movement direction of the movement input includes: the pan-tilt-zoom structure is controlled to rotate in a first plane if the movement direction of the movement input is a first movement direction, the pan-tilt-zoom structure is controlled to rotate in a second plane if the movement direction of the movement input is a second movement direction, herein the first movement direction and the second movement direction are perpendicular to each other, and the first plane and the second plane are perpendicular to each other. For example, if the first movement direction is a direction along the X axis (which faces left or right) in Cartesian coordinates, the first plane may be an XOY plane, and if the second movement direction is a direction along the Y axis (which faces upwards or downwards), the second plane may be a YOZ plane.

In the example of the present invention, the rotation direction of the pan-tilt-zoom structure can be determined according to the movement direction of the movement input, and the rotation angle of the pan-tilt-zoom structure can be determined according to the movement trajectory of the touch operation. In this way, the rotation direction and the rotation angle of the pan-tilt-zoom structure can be made to correspond to the movement input by the user, and the target object can be more accurately moved to a position desired by the user, thus the user's experience of using the electronic device can be improved.

Figure 5:
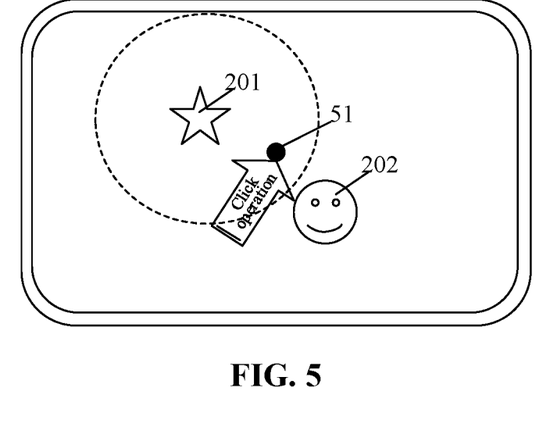
FIG. 5 is a fourth schematic diagram of a display interface according to an example of the present disclosure.
Figure 6:
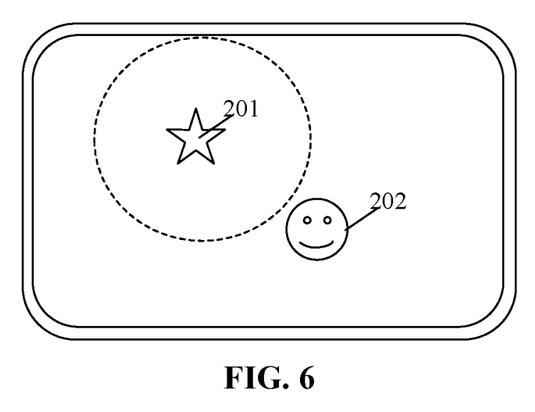
FIG. 6 is a fifth schematic diagram of a display interface according to an example of the present disclosure.
Figure 7:
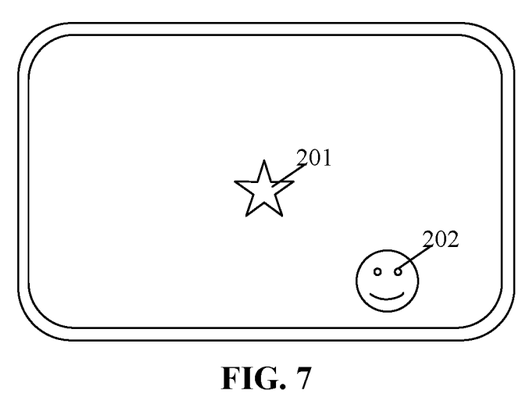
FIG. 7 is a sixth schematic diagram of a display interface according to an example of the present disclosure.

FIG. 5 is a fourth schematic diagram of a display interface according to an example of the present disclosure. As shown in FIG. 5, the preview image includes a first shot object 201 and a second shot object 202, and a target position (a second position) 51 of the target object may be determined within a movable range by a click operation. For example, the target position of the target object is determined by a double-click operation. FIG. 6 is a fifth schematic diagram of a display interface according to an example of the present disclosure, and FIG. 7 is a sixth schematic diagram of a display interface according to an example of the present disclosure. As shown in FIG. 6 and FIG. 7, FIG. 6 shows a preview image before rotation of the pan-tilt-zoom structure, FIG. 7 shows a preview image after rotation of the pan-tilt-zoom structure, and both the first shot object 201 and the second shot object 202 in FIG. 7 are moved with respect to the first shot object 201 and the second shot object 202 in FIG. 6.

Figure 8:
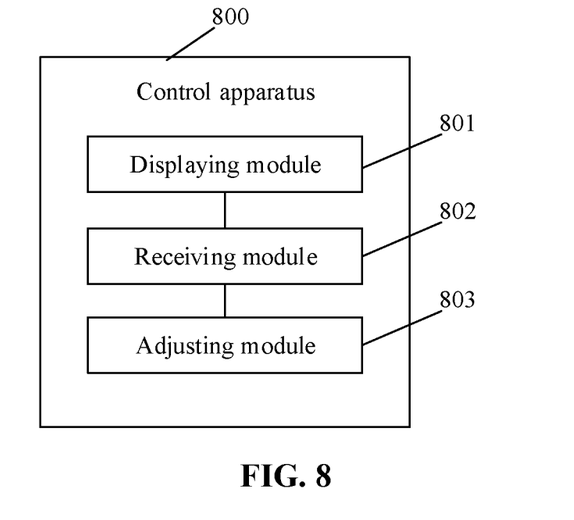
FIG. 8 is a block diagram of a control apparatus according to an example of the present disclosure.

FIG. 8 is a block diagram of a control apparatus according to an example of the present disclosure. As shown in FIG. 8, a control apparatus 800 is applied to an electronic device having a camera, and the apparatus 800 may include a displaying module 801, a receiving module 802, and an adjusting module 803.

The displaying module 801 is configured to display a preview image.

The receiving module 802 is configured to receive a user input acting on the preview image. The user input is used for adjustment of a display position of a target object in the preview image from a first position to a second position.

The adjusting module 803 is configured to: in response to the user input, adjust a shooting angle of the camera according to the adjustment of the display position.

In some examples, the receiving module 802 may further be configured to:
receive a click input at the second position in the preview image;
the adjusting module 803 may be further configured to:
determine a first deflection direction and a first deflection angle of the shooting angle of the camera according to a relative position between the first position and the second position;
adjust the shooting angle of the camera according to the first deflection direction and the first deflection angle.

In some examples, the receiving module 802 may also be configured to:
receive a movement input that moves the target object from the first position to the second position;
the adjusting module 803 may be further configured to:
determine a second deflection direction of the shooting angle of the camera according to the movement direction of the movement input;
determine a second deflection angle of the shooting angle of the camera according to the moving trajectory of the movement input;
adjust the shooting angle of the camera according to the second deflection direction and the second deflection angle.

In some examples, the receiving module 802 may also be configured to:
receive a press input acting on the target object;
the adjusting module 803 may be further configured to:
determine an adjustment distance of the display position of the target object based on preset correspondences between press force values and moving distance and a press force value of the press input;
determine a third deflection angle of the shooting angle of the camera according to the adjustment distance;
determine a third deflection direction of the shooting angle of the camera according to the press direction of the press input;
adjust the shooting angle of the camera according to the third deflection direction and the third deflection angle.

In some examples, the receiving module 802 may also be configured to:
display a movable range of the target object;
the movable range is determined according to a deflection range of the shooting angle of the camera.

In some examples, the electronic device further includes a pan-tilt-zoom structure connected to the camera.

The adjusting module 803 may be further configured to:
control, according to the adjustment of the display position, the pan-tilt-zoom structure to drive the camera to rotate, so as to adjust the shooting angle of the camera.

With respect to the apparatus in the above described examples, the specific manner in which the various modules perform operations has been described in detail in the examples relating to the method, and will not be described in detail herein.

Figure 9:
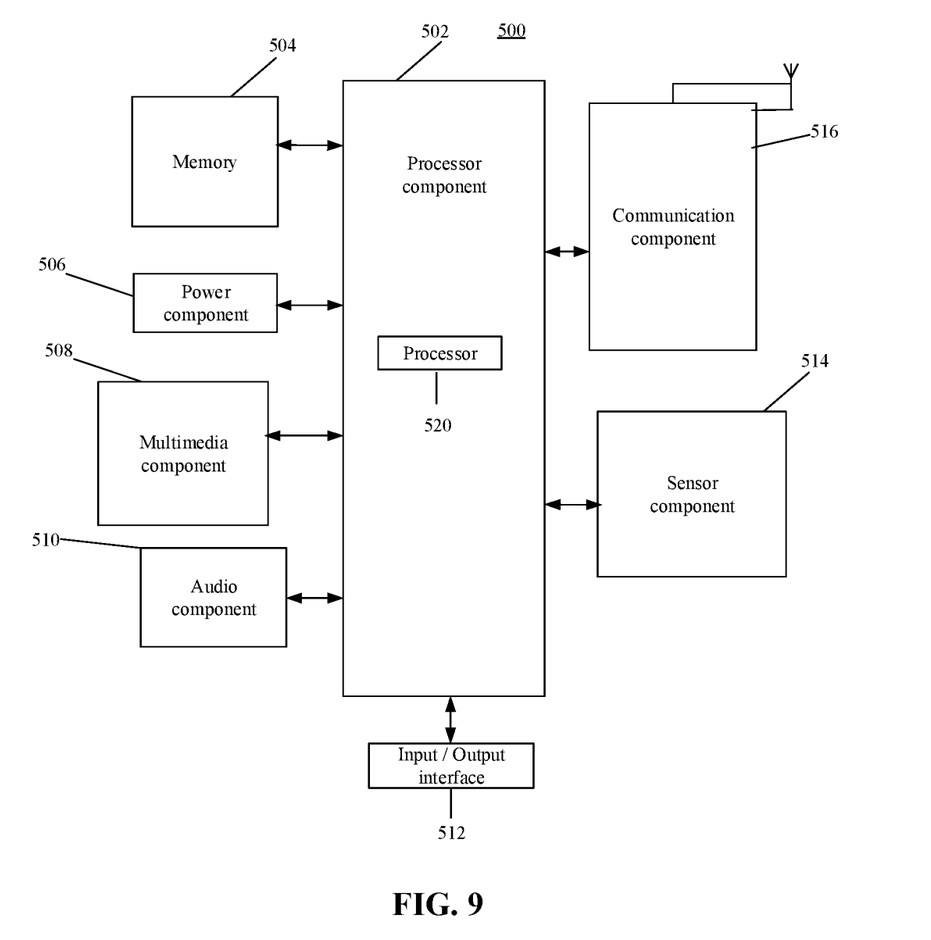
FIG. 9 is a hardware block diagram of a control apparatus according to an example of the present disclosure.

FIG. 9 is a hardware block diagram of a control apparatus according to an example of the present disclosure. For example, an apparatus 500 may be a mobile phone, a computer, a digital broadcast terminal, a messaging device, a game console, a tablet device, a medical device, an exercise device, a personal digital assistant, or the like.

Referring to FIG. 9, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 generally controls the overall operation of the apparatus 500, such as operations associated with displays, telephone calls, data communications, camera operations, and recording operations. The processing component 502 may include one or more processors 520 for executing instructions to perform all or a portion of the operations of the methods described above. In addition, the processing component 502 may include one or more modules which facilitate interaction between the processing component 502 and other components. For example, the processing component 502 may include a multimedia module which facilitates interaction between the multimedia component 508 and the processing component 502.

The memory 504 is configured to store various types of data to support operation at the apparatus 500. Examples of such data include instructions for any application or method operating on the apparatus 500, contact data, phone book data, messages, images, video, etc. The memory 504 may be implemented by any type of volatile or non-volatile storage device or combination thereof, such as Static Random Access Memory (SRAM), an Electrically Erasable Programmable Read-Only Memory (EEPROM), an Erasable Programmable Read-Only Memory (EPROM), a Programmable Read-only Memory (PROM), a Read-Only Memory (ROM), a magnetic memory, a flash memory, and a magnetic disk, or optical disk.

The power supply component 506 provides power to various components of the apparatus 500. The power component 506 may include a power management system, one or more power supplies, and other components associated with generating, managing, and distributing power for the apparatus 500.

The multimedia component 508 includes a screen providing an output interface provides between the apparatus 500 and the user. In some examples, the screen may include an Liquid Crystal Display (LCD) and a Touch Panel (TP). If the screen includes a TP, the screen may be implemented as a touch screen to receive input signals from a user. The TP includes one or more touch sensors for sensing touches, swipes and gestures on the TP. The touch sensor may not only sense the boundary of a touch or sliding action, but also detect the duration and pressure associated with the touch or slide operation. In some examples, the multimedia component 508 includes a front-facing camera and/or a rear-facing camera. The front-facing camera and/or the rear-facing camera may receive external multimedia data when the apparatus 500 is in an operation mode, such as a photographing mode or a video mode. Each of the front and rear cameras may be a fixed optical lens system or have a focal length and optical zooming capability.

The audio component 510 is configured to output and/or input audio signals. For example, the audio component 510 includes a Microphone (MIC) that is configured to receive external audio signals when the apparatus 500 is in an operating mode, such as a call mode, a recording mode, and a speech recognition mode. The received audio signal may be further stored in the memory 504 or transmitted via the communication component 516. In some examples, the audio component 510 further includes a speaker for outputting an audio signal.

The I/O interface 512 provides an interface between the processing component 502 and a peripheral interface module. The peripheral interface module may be a keyboard, a click wheel, a button, or the like. These buttons may include, but are not limited to, a home page button, a volume button, a starting button, and a locking button.

The sensor assembly 514 includes one or more sensors for providing a state assessment of various aspects of the apparatus 500. For example, the sensor assembly 514 may detect an on/off state of the apparatus 500 and a relative positioning of the assembly, such as a display and keypad of the device 500, the sensor assembly 514 may also detect a change in position of the apparatus 500 or one of the components of the apparatus 500, the presence or absence of user contact with the device 500, an orientation or acceleration/deceleration of the apparatus 500, and a change in temperature of the apparatus 500. The sensor assembly 514 may include a proximity sensor configured to detect the presence of a nearby object in the absence of any physical contact. The sensor assembly 514 may also include a light sensor, such as a Complementary Metal Oxide Semiconductor (CMOS) or Charge Coupled Device (CCD) image sensor, for use in imaging applications. In some examples, the sensor assembly 514 may also include an acceleration sensor, a gyroscope sensor, a magnetic sensor, a pressure sensor, or a temperature sensor.

The communication component 516 is configured to facilitate wired or wireless communication between apparatus 500 and other devices. The apparatus 500 may access a wireless network based on a communication standard, such as a Wireless Fidelity (WI-FI) network, a 2nd-Generation (2G) or 6rd-Generation (6G) network or a combination thereof. In one example, communication component 516 receives broadcast signals or broadcast-related information from an external broadcast management system via a broadcast channel. In one example, the communication component 516 further includes a Near Field Communication (NFC) module to facilitate short-range communication. For example, the NFC module may be implemented based on a Radio Frequency Identification (RFID) technology, an Infrared Data Association (IrDA) technology, an Ultra Wideband (UWB) technology, a Bluetooth (BT) technology, and other technologies.

In an example, the apparatus 500 may be implemented by one or more Application Specific Integrated Circuits (ASICs), Digital Signal Processors (DSPs), Digital Signal Processing Devices (DSPD), Programmable Logic Devices (PLDs), Field Programmable Gate Arrays (FPGAs), controllers, microcontrollers, microprocessors, or other electronic components for performing the methods described above.

In an example of the present disclosure, there is also provided a non-transitory computer-readable storage medium including instructions, such as the memory 504 including instructions executable by the processor 520 of the apparatus 500 to perform the above-described methods, is also provided. For example, the non-transitory computer-readable storage medium may be a ROM, a random access memory (RAM), a Compact Disc Read-Only Memory (CD-ROM), a magnetic tape, a floppy disk, an optical data storage device, or the like.

A non-transitory computer-readable storage medium that, when instructions in the storage medium are executed by a processor of an electronic device, enables the electronic device to perform a control method applied to the electronic device having a camera, the method includes the following operations.

A preview image is displaying.

A user input acting on the preview image is received, in which the user input is used for adjustment of a display position of a target object in the preview image from a first position to a second position.

A shooting angle of the camera according to the adjustment of the display position is adjusted in response to the user input.

Other examples of the present disclosure will be apparent to those skilled in the art from consideration of the specification and practice of the present disclosed. This disclosure is intended to cover any variations, uses, or adaptations of the disclosure such departures from the present disclosure as come within known or customary practice in the art. It is intended that the specification and examples be considered as exemplary only, with a true scope and spirit of the present disclosure being indicated by the following claims.

It will be appreciated that that the present disclosure is not limited to the exact construction that has been described above and illustrated in the accompanying drawings, and that various modifications and changes may be made without departing from the scope thereof. It is intended that the scope of the present disclosure only by the appended claims.

The invention claimed is:

1. A control method, comprising:
    displaying a preview image captured by a camera of an electronic device;
    displaying a movable range of a target object on the preview image in response to detecting a selection operation for the target object, wherein the movable range is an area comprising the target object and is configured for adjusting a display position of the target object within the movable range, and the movable range is determined according to a deflection range of a shooting angle of the camera;
    receiving, by the electronic device, a user input acting on the preview image, wherein the user input comprises an adjustment of the display position of the target object in the preview image from a first position to a second position within the movable range; and
    in response to the user input, adjusting, by the electronic device, the shooting angle of the camera according to the adjustment of the display position.

2. The method of claim 1, wherein receiving the user input acting on the preview image comprises:
    receiving a single-click input at the second position in the preview image; and
    wherein adjusting the shooting angle of the camera according to the adjustment of the display position comprises:
    determining a deflection direction and a deflection angle of the shooting angle of the camera according to a relative position between the first position and the second position; and
    adjusting the shooting angle of the camera according to the deflection direction and the deflection angle.

3. The method of claim 1, wherein receiving the user input acting on the preview image comprises:
    receiving a movement input that moves the target object from the first position to the second position; and
    wherein adjusting the shooting angle of the camera according to the adjustment of the display position comprises:
    determining a deflection direction of the shooting angle of the camera according to the movement direction of the movement input;
    determining a deflection angle of the shooting angle of the camera according to the moving trajectory of the movement input; and
    adjusting the shooting angle of the camera according to the deflection direction and the deflection angle.

4. The method of claim 1, wherein receiving the user input acting on the preview image comprises:
    receiving a press input acting on the target object; and
    wherein adjusting the shooting angle of the camera according to the adjustment of the display position comprises:
    determining an adjustment distance of the display position of the target object based on preset correspondences between press force values and moving distances, and a press force value of the press input;
    determining a deflection angle of the shooting angle of the camera according to the adjustment distance;
    determining a deflection direction of the shooting angle of the camera according to the press direction of the press input; and
    adjusting the shooting angle of the camera according to the deflection direction and the deflection angle.

5. The method of claim 1, wherein the electronic device further comprises a pan-tilt-zoom structure connected to the camera; and
    wherein adjusting the shooting angle of the camera according to the adjustment of the display position comprises:
    controlling, according to the adjustment of the display position, the pan-tilt-zoom structure to drive the camera to rotate and adjust the shooting angle of the camera.

6. The method of claim 5, further comprising:
    providing a pan-tilt-zoom adjustment control on the preview image; and
    receiving a user input acting on the pan-tilt-zoom adjustment control.

7. A control apparatus, comprising:
    a display screen;
    a processor; and
    a memory for storing instructions executable by the processor,
    wherein the display screen is configured to display a preview image captured by a camera of an electronic device; and display a movable range of a target object on the preview image in response to detecting a selection operation for the target object, wherein the movable range is an area comprising the target object and is configured for adjusting a display position of the target object within the movable range, and the movable range is determined according to a deflection range of a shooting angle of the camera;
    wherein the processor is configured to:
    receive a user input acting on the preview image, wherein the user input comprises an adjustment of the display position of the target object in the preview image from a first position to a second position within the movable range; and
    in response to the user input, adjust the shooting angle of the camera according to the adjustment of the display position.

8. The apparatus of claim 7, wherein the processor is further configured to:
    receive a single-click input at the second position in the preview image; and
    wherein to adjust the shooting angle of the camera according to the adjustment of the display position, the processor is further configured to:
    determine a deflection direction and a deflection angle of the shooting angle of the camera according to a relative position between the first position and the second position; and
    adjust the shooting angle of the camera according to the deflection direction and the deflection angle.

9. The apparatus of claim 7, wherein the processor is further configured to:
    receive a movement input that moves the target object from the first position to the second position; and
    wherein to adjust the shooting angle of the camera according to the adjustment of the display position, the processor is further configured to:
    determine a deflection direction of the shooting angle of the camera according to the movement direction of the movement input;
    determine a deflection angle of the shooting angle of the camera according to the moving trajectory of the movement input; and
    adjust the shooting angle of the camera according to the deflection direction and the deflection angle.

10. The apparatus of claim 7, wherein the processor is further configured to:
receive a press input acting on the target object; and
wherein to adjust the shooting angle of the camera according to the adjustment of the display position, the processor is further configured to:
determine an adjustment distance of the display position of the target object based on preset correspondences between press force values and moving distances and a press force value of the press input;
determine a deflection angle of the shooting angle of the camera according to the adjustment distance;
determine a deflection direction of the shooting angle of the camera according to the press direction of the press input; and
adjust the shooting angle of the camera according to the deflection direction and the deflection angle.

11. The apparatus of claim 7, wherein the electronic device further comprises a pan-tilt-zoom structure connected to the camera; and
wherein to adjust the shooting angle of the camera according to the adjustment of the display position, the processor is further configured to:
control, according to the adjustment of the display position, the pan-tilt-zoom structure to drive the camera to rotate and adjust the shooting angle of the camera.

12. The apparatus of claim 11, wherein the processor is further configured to:
provide a pan-tilt-zoom adjustment control on the preview image; and
receive a user input acting on the pan-tilt-zoom adjustment control.

13. A non-transitory computer-readable storage medium having stored thereon instruction that, when executed by a processor of an electronic device, cause the electronic device to perform operations of a control method, the control method comprising:
displaying a preview image captured by a camera of an electronic device;
displaying a movable range of a target object on the preview image in response to detecting a selection operation for the target object, wherein the movable range is an area comprising the target object and is configured for adjusting a display position of the target object within the movable range, and the movable range is determined according to a deflection range of a shooting angle of the camera;
receiving, by the electronic device, a user input acting on the preview image, wherein the user input comprises an adjustment of the display position of the target object in the preview image from a first position to a second position within the movable range; and
in response to the user input, adjusting, by the electronic device, the shooting angle of the camera according to the adjustment of the display position.

14. The non-transitory computer-readable storage medium of claim 13, wherein receiving the user input acting on the preview image comprises:
receiving a single-click input at the second position in the preview image; and
wherein adjusting the shooting angle of the camera according to the adjustment of the display position comprises:
determining a deflection direction and a deflection angle of the shooting angle of the camera according to a relative position between the first position and the second position; and
adjusting the shooting angle of the camera according to the deflection direction and the deflection angle.

15. The non-transitory computer-readable storage medium of claim 13, wherein receiving the user input acting on the preview image comprises:
receiving a movement input that moves the target object from the first position to the second position; and
wherein adjusting the shooting angle of the camera according to the adjustment of the display position comprises:
determining a deflection direction of the shooting angle of the camera according to the movement direction of the movement input;
determining a deflection angle of the shooting angle of the camera according to the moving trajectory of the movement input; and
adjusting the shooting angle of the camera according to the deflection direction and the deflection angle.

16. The non-transitory computer-readable storage medium of claim 13, wherein receiving the user input acting on the preview image comprises:
receiving a press input acting on the target object; and
wherein adjusting the shooting angle of the camera according to the adjustment of the display position comprises:
determining an adjustment distance of the display position of the target object based on preset correspondences between press force values and moving distances and a press force value of the press input;
determining a deflection angle of the shooting angle of the camera according to the adjustment distance;
determining a deflection direction of the shooting angle of the camera according to the press direction of the press input; and
adjusting the shooting angle of the camera according to the deflection direction and the deflection angle.

17. The non-transitory computer-readable storage medium of claim 13, wherein the electronic device further comprises a pan-tilt-zoom structure connected to the camera; and
wherein adjusting the shooting angle of the camera according to the adjustment of the display position comprises:
controlling, according to the adjustment of the display position, the pan-tilt-zoom structure to drive the camera to rotate and adjust the shooting angle of the camera.

* * * * *